(12) United States Patent
Hisamitsu et al.

(10) Patent No.: US 6,699,534 B2
(45) Date of Patent: Mar. 2, 2004

(54) LIQUID CRYSTAL DISPLAY ELEMENT

(75) Inventors: Akihito Hisamitsu, Amagasaki (JP); Shoji Kotani, Otsu (JP); Takeshi Kitahora, Osaka (JP); Hideaki Ueda, Kishiwada (JP)

(73) Assignee: Minolta Co., Ltd., Osaka (JP)

( * ) Notice: Subject to any disclaimer, the term of this patent is extended or adjusted under 35 U.S.C. 154(b) by 71 days.

(21) Appl. No.: 09/887,654

(22) Filed: Jun. 22, 2001

(65) Prior Publication Data

US 2002/0006480 A1 Jan. 17, 2002

(30) Foreign Application Priority Data

Jun. 30, 2000 (JP) ........................................ 2000-237724

(51) Int. Cl.⁷ .............................................. C09K 19/00
(52) U.S. Cl. ................... 428/1.26; 252/299.01
(58) Field of Search ........................ 564/305; 428/1.26; 252/299.01

(56) References Cited

U.S. PATENT DOCUMENTS 5,861,534 A     1/1999  Nihira et al. ................ 564/305

FOREIGN PATENT DOCUMENTS

JP          09-143470 A     6/1997

OTHER PUBLICATIONS

Miyamoto et al (Cas Online Printout; 1997:324001; 1997).*
Nishikawa et al (Cas Online Printout; 1998:455348; 1998).*

* cited by examiner

*Primary Examiner*—Samuel Barts
(74) *Attorney, Agent, or Firm*—Sidley Austin Brown & Wood LLP

(57) ABSTRACT

Disclosed is a liquid crystal display element which comprises a pair of substrates and a liquid crystal layer held between the pair of substrates and including liquid crystal that exhibits a cholesteric phase. At least one of the substrates has an orientation film that comprises a polyimide having a mesogenic group therein and has not undergone rubbing.

31 Claims, 4 Drawing Sheets

FIG. 5

|  | | Substrates | Material of orientation film | Liquid crystal compounds | Y-values (colored/non-colored) | Contrast | Orientation film thickness (Å) |
|---|---|---|---|---|---|---|---|
| Single-layered element | Experiment 1 | Glass substrates | Compounds indicated by formulae (1), (2) & (3) | B1 | 22.4/2.6 | 8.6:1 | 800 |
| | Comparison 1 | Glass substrates | Compounds indicated by formulae (1) & (2) | B1 | 22.6/3.8 | 5.9:1 | 800 |
| Multi-layered element | Experiment 2 | Polycarbonate substrates | Compounds indicated by formulae (1), (2) & (3) | A1, B1, C1 | 28.5/4.3 | 6.6:1 | 500 |
| | Experiment 3 | Polycarbonate substrates | Compounds indicated by formulae (1), (2) & (4) | A1, B1, C1 | 28.8/4.8 | 6.0:1 | 800 |
| | Experiment 4 | Polycarbonate substrates | Compounds indicated by formulae (1), (2) & (3) | D1, D2, D3 | 27.9/4.4 | 6.3:1 | 1000 |
| | Experiment 5 | Polycarbonate substrates | Compounds indicated by formulae (1), (2) & (5) | D1, D2, D3 | 27.4/4.7 | 5.8:1 | 300 |
| | Comparison 2 | Polycarbonate substrates | Compounds indicated by formulae (1) & (2) | A1, B1, C1 | 29.3/6.1 | 4.8:1 | 800 |
| | Comparison 3 | Glass substrates | Compounds indicated by formulae (1), (2) & (3) | B1 | - | - | 800 |

LIQUID CRYSTAL DISPLAY ELEMENT

CROSS-REFERENCE TO RELATED APPLICATION

This application is based on Japanese Patent Application No. 2000-237724 filed in Japan on Jun. 30, 2000, the entire content of which is hereby incorporated by reference.

BACKGROUND OF THE INVENTION

1. Field of the Invention

The present invention relates to a liquid crystal display element.

2. Description of the Related Art

In recent years, research has been carried out regarding various types of liquid crystal display elements that use liquid crystal exhibiting a cholesteric phase. Chiral nematic liquid crystal comprising nematic liquid crystal to which a chiral dopant is added such that the liquid crystal exhibits a cholesteric phase at room temperature is one of the representative cholesteric liquid crystal materials.

Such a liquid crystal display element generally has a construction in which a liquid crystal layer including liquid crystal that exhibits a cholesteric phase is held between a pair of substrates, and is used, for example, as a reflective liquid crystal display element that takes advantage of the selective reflection property of the liquid crystal that exhibits a cholesteric phase. Display is carried out in a reflective liquid crystal display element of this type by alternating the liquid crystal from a planar state (colored state) to a focal conic state (non-colored state) and vice versa through the application of a high or low voltage.

Incidentally, an orientation film may be used in such a liquid crystal display element in order to control the orientation of the liquid crystal molecules.

However, when an orientation film is used in a conventional reflective liquid crystal display element using liquid crystal that exhibits a cholesteric phase, if the interaction between the liquid crystal and the orientation film is not sufficiently strong, the liquid crystal molecules are not uniformly controlled by the orientation effect, so that diffusion based on the focal conic state increases and sufficient contrast is not obtained. It is possible to perform rubbing the orientation film (i.e., a process in which the surface of the orientation film is rubbed in one direction using nylon cloth, for example) in order to increase the interaction between the liquid crystal and the orientation film, but if that is done, the element's dependence on the angle of view increases.

SUMMARY OF THE INVENTION

An object of the present invention is therefore to provide an improved liquid crystal display element comprising a liquid crystal layer that is held between a pair of substrates and includes liquid crystal that exhibits a cholesteric phase.

Another object of the present invention is to provide a liquid crystal display element comprising a liquid crystal layer that is held between a pair of substrates and includes liquid crystal that exhibits a cholesteric phase, wherein the orientation effect can uniformly control the molecules of the liquid crystal, enabling the display of high-contrast images.

Still another object of the present invention is to provide a liquid crystal display element comprising a liquid crystal layer that is held between a pair of substrates and includes liquid crystal that exhibits a cholesteric phase, wherein the element's dependence on the angle of view may be reduced.

For a liquid crystal display element comprising (1) a liquid crystal layer held between a pair of substrates and including liquid crystal exhibiting a cholesteric phase and (2) an orientation film on at least one of the substrates, it has been found that the introduction of a mesogenic group (i.e., a substitutional group that has a molecular interaction with the molecules of the liquid crystal) into the orientation film causes increased interaction between the liquid crystal and the orientation film, thereby resulting in a uniform orientation effect extending to the liquid crystal molecules, reduced diffusion when the focal conic state is present, and improved contrast in the display images. It has also been found that the element's dependence on the angle of view may be reduced without the need for rubbing of the orientation film.

The present invention was created based on this knowledge, and in order to resolve the above problems, a liquid crystal display element reflecting one aspect of the present invention comprises a liquid crystal layer that is held between a pair of substrates and includes liquid crystal that exhibits a cholesteric phase, wherein at least one of the substrates has an orientation film that comprises a polyimide having a mesogenic group in its structure and the orientation film has not undergone rubbing.

The mesogenic group referred to in the present specification means a substitutional group having a rigid structure necessary for the molecules to exhibit a liquid crystal nature. Such mesogenic groups include, for example, a cholesterol group, a biphenyl group or a phenylbenzoate group.

The liquid crystal display element pertaining to the above mentioned structure may be used as a reflective liquid crystal display element that takes advantage of the selective reflection property of the liquid crystal that exhibits a cholesteric state.

When the liquid crystal display element pertaining to the above mentioned structure is used as a reflective liquid crystal display element, display is performed by alternating the liquid crystal between a planar state (colored state) and a focal conic state (non-colored state) through the application of a high or low voltage.

Because the orientation film comprises a polyimide having a mesogenic group in its structure, when the liquid crystal display element pertaining to the above mentioned structure is used, the interaction between the liquid crystal and the orientation film increases, so that the orientation effect may be uniformly extended to the molecules of the liquid crystal and the contrast of the image display may be improved accordingly. In addition, because the orientation film does not undergo rubbing, the element's dependence on the angle of view may be reduced.

The mesogenic group referred to above may belong to any of the following groups:

(a) A mesogenic group that includes a steroid skeleton, biphenyl skeleton or phenylcyclohexane skeleton;

(b) A side chain of a diamine compound that forms a polyimide; and (c) A combination of (a) and (b) above.

The chemical formulae of the compounds from which the material of the orientation film may be synthesized are shown in (1) through (5) below.

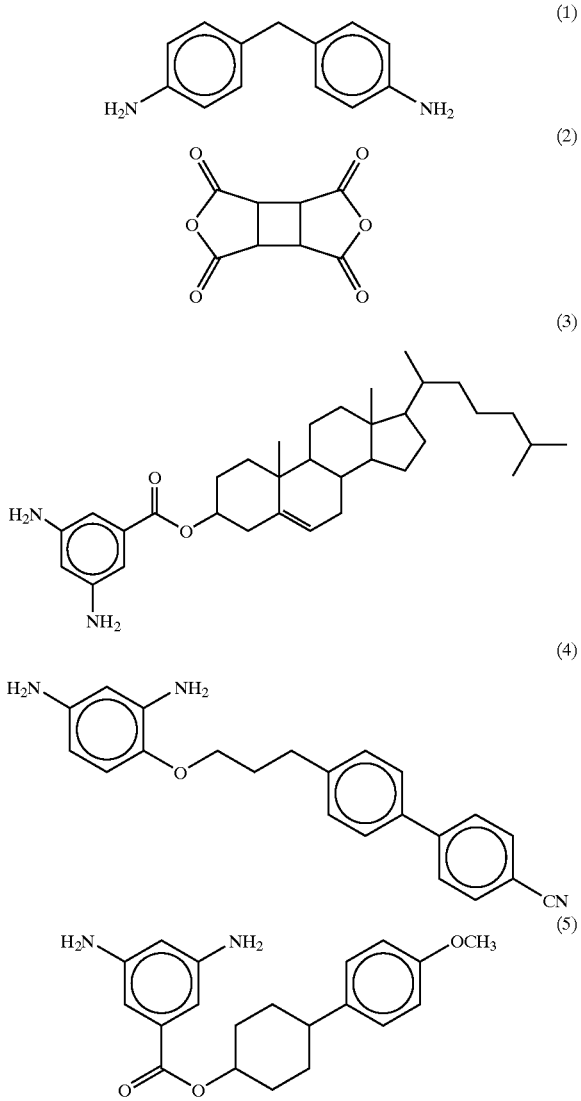

Any of the following films may be used as the orientation film, for example:
  (a) A film comprising a polyimide that is synthesized from the compounds indicated by the chemical formulae (1), (2) and (3) and that has in its structure a mesogenic group including a steroid skeleton;
  (b) A film comprising a polyimide that is synthesized from the compounds indicated by the chemical formulae (1), (2) and (4) and that has in its structure a mesogenic group including a biphenyl skeleton; or
  (c) A film comprising a polyimide that is synthesized from the compounds indicated by the chemical formulae (1), (2) and (5) and that has in its structure a mesogenic group including a phenylcyclohexane skeleton.

In any event, the liquid crystal that exhibits a cholesteric phase may be chiral nematic liquid crystal comprising nematic liquid crystal to which a chiral dopant is added. In this case, it is preferred that the chiral dopant be added in the range between 7 percent by weight and 50 percent by weight, for example.

Where chiral nematic liquid crystal comprising nematic liquid crystal to which a chiral dopant is added is used as the liquid crystal that exhibits a cholesteric phase, the benefit obtained is that the selective reflection wavelength of the chiral nematic liquid crystal may be controlled by changing the amount of the chiral dopant added. If the amount of the chiral dopant added is too small, a sufficient memory capability (i.e., maintenance of the planar state in the area that was in the planar state or maintenance of the focal conic state in the area that was in the focal conic state when the application of voltage was stopped) may not be obtained. If the amount of the chiral dopant is too large, the liquid crystal may no longer exhibit a cholesteric phase at room temperature or may solidify.

In any event, if the orientation film is too thin, the orientation of the liquid crystal molecules may not be controlled, and if it is too thick, the drive voltage increases. The thickness of the orientation film is preferably between 100 Å and 2,000 Å, for example.

Two or more liquid crystal display elements pertaining to the present invention may be stacked together to form a multi-layered liquid crystal display element. In this case, color display using two or more colors may be performed by stacking together two or more liquid crystal display elements that perform display of different colors. If at least three liquid crystal display elements, which perform blue display, green display and red display, respectively, are used in a multi-layered liquid crystal element, full-color display may be performed.

In any event, in such a multi-layered liquid crystal display element, one substrate may be shared between two adjacent liquid crystal display elements.

BRIEF DESCRIPTION OF THE DRAWINGS

These and other objects, advantages and features of the invention will become apparent from the following description thereof taken in conjunction with the accompanying drawings in which:

FIG. 5 is a table showing the results of the experiment examples 1–5 and comparison examples 1–3.

PREFERRED EMBODIMENTS OF THE PRESENT INVENTION

The embodiments of the present invention are described below with reference to the drawings.

Figure 1:
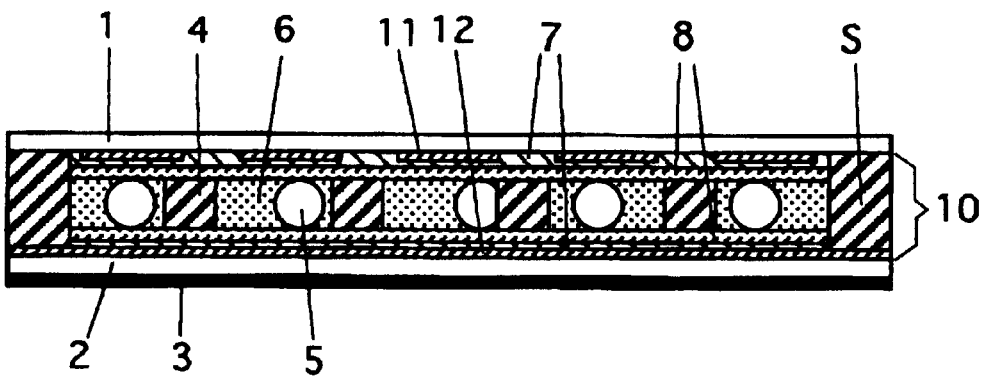
FIG. 1 is a basic cross-sectional view of one example of the liquid crystal display element pertaining to the present invention.
Figure 2:
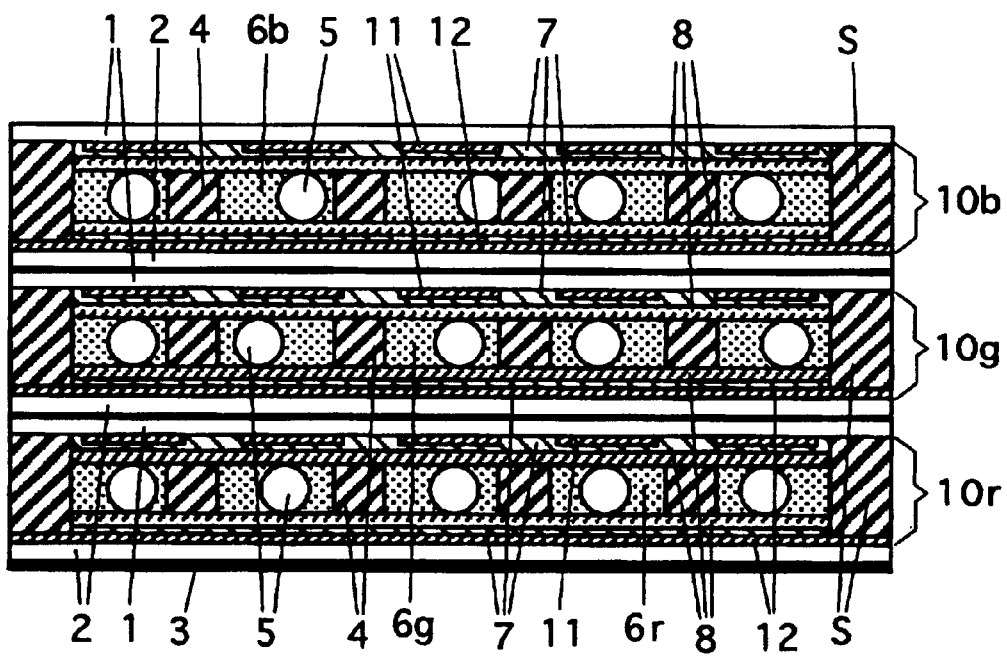
FIG. 2 is a basic cross-sectional view showing another example of the liquid crystal display element pertaining to the present invention, which includes three liquid crystal layers that perform blue display, green display and red display, respectively.

FIG. 1 is a basic cross-sectional view of one example of the liquid crystal display element pertaining to the present invention. FIG. 2 shows another example of the liquid crystal display element pertaining to the present invention, and shows a basic cross-sectional view of a multi-layered liquid crystal display element including three liquid crystal layers, which perform blue display, green display and red display, respectively. In the liquid crystal display elements shown in FIGS. 1 and 2, members that basically have the same construction and perform the same action are given the same number.

The liquid crystal display element shown in FIG. 1 has between a pair of substrates 1 and 2 a liquid crystal layer 10 including liquid crystal 6 that exhibits a cholesteric phase. The liquid crystal display element shown in FIG. 2 has between each pair of substrates 1 and 2 a liquid crystal layer 10b that includes liquid crystal 6b that exhibits a cholesteric phase and performs blue display, a liquid crystal layer 10g that includes liquid crystal 6g that exhibits a cholesteric phase and performs green display and a liquid crystal layer 10r that includes liquid crystal 6r that exhibits a cholesteric phase and performs red display, respectively.

The pair of substrates that may be used in the liquid crystal display element of the present embodiment, including the substrates 1 and 2, must include at least one substrate that allows the incident light to pass through. In addition, a visible light-absorbing layer is placed on the outside surface (back surface) of the substrate opposite the side from which the light enters, where necessary. In these examples, the two substrates 1 and 2 allow the incident light to pass through, and a black light-absorbing layer 3 is located on the back surface (outside surface) of the substrate 2 in the example of FIG. 1, and on the back surface (outside surface) of the outside substrate 2 that holds the liquid crystal layer 10r in the example of FIG. 2.

Substrates that allow the incident light to pass through are glass substrates, as an example. Other than glass substrates, flexible substrates comprising a polymer resin, such as polycarbonate, polyether sulfone, polyethylene terephthalate and polyallylate, may be used, for example.

The substrates 1 and 2 have transparent electrodes 11 and 12, respectively. The transparent electrodes 11 and 12 comprise ITO in these examples.

In the liquid crystal display elements shown in FIGS. 1 and 2, multiple belt-shaped transparent electrodes 11 and 12 that are parallel to each other at certain intervals are formed on the surfaces of the transparent substrates 1 and 2, respectively, and the substrates 1 and 2 are placed opposite each other such that the orientations of the transparent electrodes 11 and 12 are perpendicular to each other. The areas at which the transparent electrodes 11 and 12 overlap comprise display pixels.

In the liquid crystal display element of the present invention, including the liquid crystal display elements shown in FIGS. 1 and 2, an insulating film that prevents the short-circuiting of the electrodes and functions as a gas barrier to improve the reliability of the liquid crystal may be placed on the surfaces of the substrates where necessary. In the liquid crystal display elements of FIGS. 1 and 2, an insulating film 7 is placed on each of the transparent electrodes 11 and 12. An orientation film 8 is placed on each insulating film 7. The orientation film 8 comprises a polyimide that has a mesogenic group in its structure and has not undergone rubbing. While both of the substrates 1 and 2 have an orientation film 8 in these examples, it is acceptable if it is placed on at least one of the substrates 1 and 2.

A sealing member that seals off the periphery of the element such that the liquid crystal does not leak out may be used in the liquid crystal display element of the present invention, including the liquid crystal display elements shown in FIGS. 1 and 2. A sealing member S, which seals in the liquid crystal 6 or 6r, 6g and 6b, respectively, is located between the substrates 1 and 2 and on the peripheral edges of the substrates 1 and 2, which are outside the display area, in the examples shown in the drawings.

For the sealing member, a heat-cured adhesive material or light-cured adhesive material such as an epoxy resin or acrylic resin may be used, for example.

Spacers for maintaining a uniform gap between the substrates may be placed between the substrates in the liquid crystal display element of the present invention, including the liquid crystal display elements shown in FIG. 1 or FIG. 2. The liquid crystal display elements shown in FIGS. 1 and 2 have spacers 5 located between the substrates 1 and 2. For these spacers, resin or inorganic oxide spheres may be used, for example.

Multiple resin bodies may be placed between the substrates of the liquid crystal display element of the present invention, including the liquid crystal display elements shown in FIG. 1 or FIG. 2, in order to provide the element with a strong shape maintenance ability. In the liquid crystal display elements of the examples, as shown in FIGS. 1 and 2, column-like bodies 4 are placed in the display area between the substrates 1 and 2.

Figure 3:
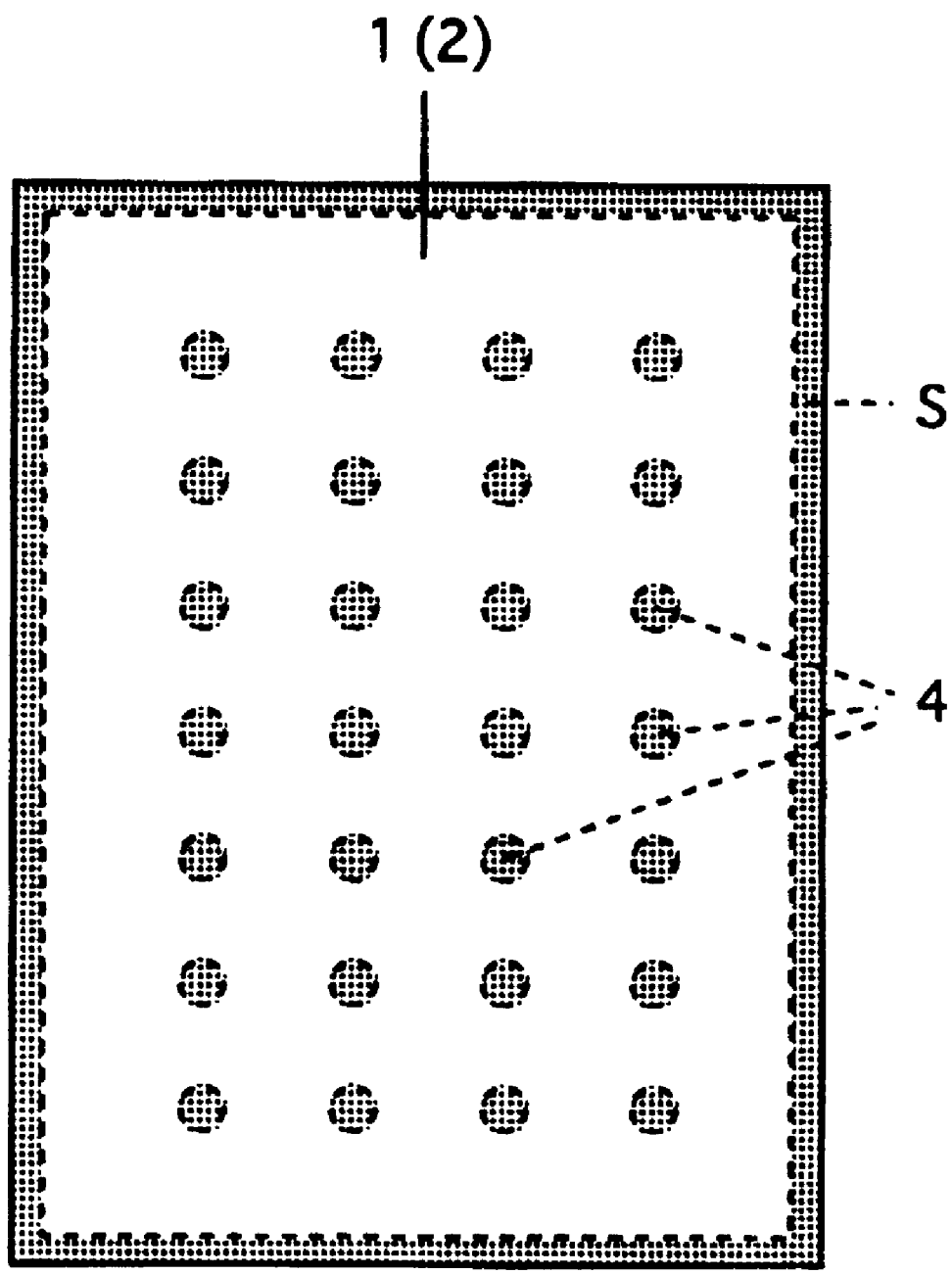
FIG. 3 is a drawing showing one example of the arrangement of resin bodies used in the liquid crystal display element pertaining to the present invention.

FIG. 3 shows the arrangement of the resin bodies 4. As shown in FIG. 3, the resin bodies 4 in the display area may comprise columns that are aligned at certain intervals based on a prescribed arrangement rule, such as a lattice arrangement, and have the cross-sectional configuration of a circle, square or oval.

The liquid crystal display element of FIG. 1 performs display by alternating the liquid crystal 6 in each pixel area between a planar state (colored state) and focal conic state (non-colored state or black display state) through the application of a prescribed voltage.

The liquid crystal display element of FIG. 2 performs display by alternating the liquid crystal 6r, 6g and 6b in each pixel area between a colored state and non-colored state through the application of a prescribed voltage. In the liquid crystal display element of FIG. 2, if the liquid crystal materials 6r, 6g and 6b are all in a colored state, white is displayed, and if all of them are in a non-colored state, black is displayed.

Using the liquid crystal display element described above, because the orientation film 8 comprises a polyimide that has a mesogenic group in its structure, the interaction between the liquid crystal 6 or 6b, 6g and 6r and the orientation film 8 increases and the liquid crystal molecules of the liquid crystal 6 or 6b, 6g and 6r may be uniformly oriented, enabling the contrast in the display images to be improved accordingly. In addition, because the orientation film 8 does not undergo rubbing, the element's dependence on the angle of view may be reduced.

The inventors performed experiments to evaluate the performance of liquid crystal display elements pertaining to the present invention. These experiments are explained below together with comparison experiments.

In each experiment example below, $\Delta n$ is the refractive index anisotropy, $\Delta \epsilon$ is the dielectric constant anisotropy, and $T_{N-I}$ is the isotropic phase transition temperature. The contrast was measured by measuring the Y-values (luminous reflectance). The Y-values were measured using a CM3700d spectrophotometric calorimeter (manufactured by Minolta, Co., Ltd.) that has a white light source.

The contrast is given as (Y-value during high-reflectance state/Y-value during low-reflectance state). In the liquid crystal display element in each experiment example explained below, a high-reflectance state is obtained when the liquid crystal display element is in a colored state, while a low-reflectance state is obtained when the element is in a non-colored state.

EXPERIMENT EXAMPLE 1

A liquid crystal compound B1 was prepared by adding 26% by weight of S-811 chiral material (manufactured by Merck & Co.) to a nematic liquid crystal mixture B ($\Delta n=0.210$, $\Delta\epsilon=38.7$, $T_{N-I}=119°$ C.). The liquid crystal compound B1 was adjusted to selectively reflect light having a wavelength of around 560 nm.

For one substrate, a glass substrate on which transparent electrodes were formed was used. An 800 Å-thick orientation film comprising a polyimide that was synthesized from the compounds indicated by the chemical formulae (1), (2) and (3) and had a mesogenic group in its structure was formed on the transparent electrodes.

For the other substrate, a glass substrate on which transparent electrodes were formed was used. A 2,000 Å-thick HIM3000 insulating film (manufactured by Hitachi Chemical Co., Ltd.) was formed on the transparent electrodes, and a 800 Å-thick orientation film comprising a polyimide that was synthesized from the compounds indicated by the chemical formulae (1), (2) and (3) and had a mesogenic group in its structure was then formed on the insulating film.

Subsequently, an XN21S sealing member (manufactured by Mitsui Chemicals Co., Ltd.) was printed via screen printing on the peripheral edges of one of the substrates for each liquid crystal layer to form walls of a prescribed height thereon.

The two substrates were placed opposite from each other, and the cell gap was adjusted using 7 μm-diameter spacers (manufactured by Sekisui Finechemical Co., Ltd.) placed between the substrates. The liquid crystal compound B1 was placed in the cell, whereupon a liquid crystal display element was obtained.

A black light-absorbing body was placed on the outside surface (back surface) of the substrate opposite the side through which light enters the element.

When the liquid crystal display element was driven using prescribed voltages (for colored state −65V, 5 ms, for non-colored state −40V, 5 ms) in order to alternate it between a colored state and a non-colored state, the Y-value was 22.4 during green display and 2.6 during black display while the contrast was 8.6:1, representing good performance during both colored display and black display. Because the black display performance was particularly good, a high-contrast liquid crystal display element was obtained.

EXPERIMENT EXAMPLE 2

Liquid crystal compounds A1, B1 and C1 were prepared by adding prescribed amounts, i.e., 21% by weight, 26% by weight and 36% by weight, of S-811 chiral material (manufactured by Merck & Co.) to a nematic liquid crystal mixture A ($\Delta n=0.212$, $\Delta\epsilon=44$, $T_{N-I}=103°$ C.), a nematic liquid crystal mixture B ($\Delta n=0.210$, $\Delta\epsilon=38.7$, $T_{N-I}=119°$ C.) and a nematic liquid crystal mixture C ($\Delta n=0.214$, $\Delta\epsilon=7.6$, $T_{N-I}=143°$ C.), respectively. The liquid crystal compounds A1, B1 and C1 were adjusted to selectively reflect light having wavelengths of around 680 nm, 560 nm and 480 nm, respectively.

Three polycarbonate (PC) film substrates on which transparent electrodes were formed were used as one of the pair of substrates for each liquid crystal layer. A 500 Å-thick orientation film comprising a polyimide that was synthesized from the compounds indicated by the chemical formulae (1), (2) and (3) and that had a mesogenic group in its structure was formed on the transparent electrodes on each PC film substrate, and 9 μm, 7 μm and 5 μm-diameter spacers (manufactured by Sekisui Finechemical Co., Ltd.) were respectively sprayed onto the orientation films.

Three more PC film substrates on which transparent electrodes were formed were used for the other substrate of the pair of substrates for each liquid crystal layer. A 2,000 Å-thick HIM3000 insulating film (manufactured by Hitachi Chemical Co., Ltd.) was first formed on the transparent electrodes of each PC film substrate, and a 500 Å-thick orientation film comprising a polyimide that was synthesized from the compounds indicated by the chemical formulae (1), (2) and (3) and that had a mesogenic group in its structure was formed on each insulating film.

Subsequently, an XN21S sealing member (manufactured by Mitsui Chemicals Co., Ltd.) was printed via screen printing on the peripheral edges of one of the substrates for each liquid crystal layer to form walls of a prescribed height.

Figure 4:
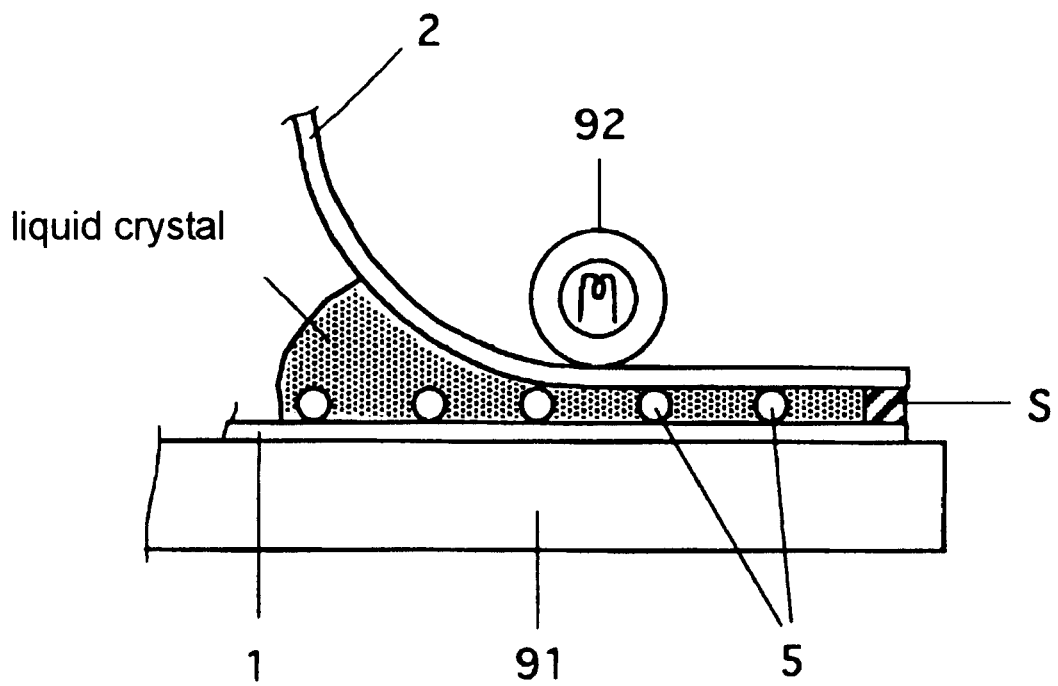
FIG. 4 is a drawing showing one example of the bonding device that bonds together the pair of substrates in order to manufacture the liquid crystal display element pertaining to the present invention.

The liquid crystal compounds A1, B1 and C1 were applied to each of the second substrates using an amount calculated from the height of the sealing member and the area of the part surrounded by the sealing member, two substrates were placed together for each liquid crystal layer such that the surfaces having the transparent electrodes faced each other, and each substrate pair was heated while being pressured from both sides. Pressurization and heating may be carried out using the bonding device shown in FIG. 4, for example. One substrate 1 is placed on a flat panel 91, the other substrate 2 is placed over the first substrate, and the substrates are relatively passed between the roller 92 and the flat panel 91 while heat and pressure are applied thereto, starting from the ends thereof, using the heating/pressure roller 92. In FIG. 4, S and 5 represent the sealing walls and spacers. Two substrates were assembled in this fashion for each liquid crystal layer, and were heated at 150° C. for one hour, whereupon liquid crystal cells a1, b1 and c1 were obtained.

These three liquid crystal cells were stacked together in the order of a1, b1 and c1, whereupon a liquid crystal display element was obtained. A black light-absorbing film was placed on the back surface of the liquid crystal display element (the outside surface (back surface) of the liquid crystal cell a1).

When each liquid crystal cell was driven using prescribed voltages (for colored state −60V, 5 ms for a1, 65V, 5 ms for b1, 75V, 5 ms for c1; for non-colored state −40V, 5 ms for a1, 40V, 5 ms for b1, 50V, 5 ms for c1) in order to alternate them between a colored and non-colored state, the Y-value of the liquid crystal display element was 28.5 during white display and 4.3 during black display, while the contrast of the liquid crystal display element was 6.6:1 (W (white)/B (black)), representing good performance during both white display and black display. Because the black display performance was particularly good, a high-contrast liquid crystal display element was obtained.

EXPERIMENT EXAMPLE 3

Liquid crystal compounds A1, B1 and C1 were prepared by adding prescribed amounts, i.e., 21% by weight, 26% by weight and 36% by weight, of S-811 chiral material (manufactured by Merck & Co.) to a nematic liquid crystal mixture A ($\Delta n=0.212$, $\Delta\epsilon=44$, $T_{N-I}=103°$ C.), a nematic liquid crystal mixture B ($\Delta n=0.210$ $\Delta\epsilon=38.7$, $T_{N-I}=119°$ C.) and a nematic liquid crystal mixture C ($\Delta n=0.214$, $\Delta\epsilon=7.6$, $T_{N-I}=143°$ C.), respectively. The liquid crystal compounds A1, B1 and C1 were adjusted to selectively reflect light having wavelengths of around 680 nm, 560 nm and 480 nm, respectively.

Three polycarbonate (PC) film substrates on which transparent electrodes were formed were used as one of the pair of substrates for each liquid crystal layer. A 800 Å-thick orientation film comprising a polyimide that was synthesized from the compounds indicated by the chemical formulae (1), (2) and (4) and that had a mesogenic group in its structure was formed on the transparent electrodes on each PC film substrate, and 9 μm, 7 μm and 5 μm-diameter spacers (manufactured by Sekisui Finechemical Co., Ltd.) were respectively sprayed onto the orientation films.

Three more PC film substrates on which transparent electrodes were formed were used for the other substrate of the pair of substrates for each liquid crystal layer. A 2,000 Å-thick HIM3000 insulating film (manufactured by Hitachi Chemical Co., Ltd.) was first formed on the transparent electrodes of each PC film substrate, and a 800 Å-thick orientation film comprising a polyimide that was synthesized from the compounds indicated by the chemical formulae (1), (2) and (4) and that had a mesogenic group in its structure was formed on each insulating film.

Subsequently, an XN21S sealing member (manufactured by Mitsui Chemicals Co., Ltd.) was printed via screen printing on the peripheral edges of one of the substrates for each liquid crystal layer to form walls of a prescribed height.

The liquid crystal compounds A1, B1 and C1 were applied to each of the second substrates using an amount calculated from the height of the sealing member and the area of the part surrounded by the sealing member. Two substrates were bonded together for each liquid crystal layer in the same manner as in the experiment example 2 using a bonding device, and were heated at 150° C. for one hour, whereupon liquid crystal cells a1, b1 and c1 were obtained.

These three liquid crystal cells were stacked together in the order of a1, b1 and c1, whereupon a liquid crystal display element was obtained. A black light-absorbing film was placed on the back surface of the liquid crystal display element (the outside surface (back surface) of the liquid crystal cell a1).

When each liquid crystal cell was driven using prescribed voltages (for colored state −60V, 5 ms for a1, 65V, 5 ms for b1, 75V, 5 ms for c1; for non-colored state −40V, 5 ms for a1, 40V, 5 ms for b1, 50V, 5 ms for c1) in order to alternate them between a colored and non-colored state, the Y-value of the liquid crystal display element was 28.8 during white display and 4.8 during black display, while the contrast of the liquid crystal display element was 6.0:1 (W (white)/B (black)), representing good performance during both white display and black display. Because the black display performance was particularly good, a high-contrast liquid crystal display element was obtained.

EXPERIMENT EXAMPLE 4

Liquid crystal compounds D1, D2 and D3 were prepared by adding prescribed amounts, i.e., 22% by weight, 28% by weight and 48% by weight, of S-811 chiral material (manufactured by Merck & Co.) to a nematic liquid crystal mixture D ($\Delta n=0.204$, $\Delta \epsilon=7.4$, $T_{N-I}=91.7°$ C.), respectively. The liquid crystal compounds D1, D2 and D3 were adjusted to selectively reflect light having wavelengths of around 680 nm, 560 nm and 480 nm, respectively.

Three polycarbonate (PC) film substrates on which transparent electrodes were formed were used as one of the pair of substrates for each liquid crystal layer. A 1,000 Å-thick orientation film comprising a polyimide that was synthesized from the compounds indicated by the chemical formulae (1), (2) and (3) and that had a mesogenic group in its structure was formed on the transparent electrodes on each PC film substrate, and 9 μm, 7 μm and 5 μm-diameter spacers (manufactured by Sekisui Finechemical Co., Ltd.) were respectively sprayed onto the orientation films.

Three more PC film substrates on which transparent electrodes were formed were used for the other substrate of the pair of substrates for each liquid crystal layer. A 2,000 Å-thick HIM3000 insulating film (manufactured by Hitachi Chemical Co., Ltd.) was first formed on the transparent electrodes of each PC film substrate, and a 1,000 Å-thick orientation film comprising a polyimide that was synthesized from the compounds indicated by the chemical formulae (1), (2) and (3) and that had a mesogenic group in its structure was formed on each insulating film.

Subsequently, an XN21S sealing member (manufactured by Mitsui Chemicals Co., Ltd.) was printed via screen printing on the peripheral edges of one of the substrates for each liquid crystal layer to form walls of a prescribed height.

The liquid crystal compounds D1, D2 and D3 were applied to each of the second substrates using an amount calculated from the height of the sealing member and the area of the part surrounded by the sealing member. Two substrates were bonded together for each liquid crystal layer in the same manner as in the experiment example 2 using a bonding device, and were heated at 150° C. for one hour, whereupon liquid crystal cells d1, d2 and d3 were obtained.

These three liquid crystal cells were stacked together in the order of d1, d2 and d3, whereupon a liquid crystal display element was obtained. A black light-absorbing film was placed on the back surface of the liquid crystal display element (the outside surface (back surface) of the liquid crystal cell d1).

When each liquid crystal cell was driven using prescribed voltages (for colored state −105V, 5 ms for d1, 85V, 5 ms for d2, 60V, 5 ms for d3; for non-colored state −60V, 5 ms for d1, 50V, 5 ms for d2, 35V, 5 ms for d3) in order to alternate them between a colored and non-colored state, the Y-value of the liquid crystal display element was 27.9 during white display and 4.4 during black display, while the contrast of the liquid crystal display element was 6.3:1 (W (white)/B (black)), representing good performance during both white display and black display. Because the black display performance was particularly good, a high-contrast liquid crystal display element was obtained.

EXPERIMENT EXAMPLE 5

Liquid crystal compounds D1, D2 and D3 were prepared by adding prescribed amounts, i.e., 22% by weight, 28% by weight and 48% by weight, of S-811 chiral material (manufactured by Merck & Co.) to a nematic liquid crystal mixture D ($\Delta n=0.204$, $\Delta \epsilon=7.4$, $T_{N-I}=91.7°$ C.), respectively. The liquid crystal compounds D1, D2 and D3 were adjusted to selectively reflect light having wavelengths of around 680 nm, 560 nm and 480 nm, respectively.

Three polycarbonate (PC) film substrates on which transparent electrodes were formed were used as one of the pair of substrates for each liquid crystal layer. A 300 Å-thick orientation film comprising a polyimide that was synthesized from the compounds indicated by the chemical formulae (1), (2) and (5) and that had a mesogenic group in its structure was formed on the transparent electrodes on each PC film substrate, and 9 μm, 7 μm and 5 μm-diameter spacers (manufactured by Sekisui Finechemical Co., Ltd.) were respectively sprayed onto the orientation films.

Three more PC film substrates on which transparent electrodes were formed were used for the other substrate of the pair of substrates for each liquid crystal layer. A 2,000 Å-thick HIM3000 insulating film (manufactured by Hitachi Chemical Co., Ltd.) was first formed on the transparent electrodes of each PC film substrate, and a 300 Å-thick orientation film comprising a polyimide that was synthesized from the compounds indicated by the chemical formulae (1), (2) and (5) and that had a mesogenic group in its structure was formed on each insulating film.

Subsequently, an XN21S sealing member (manufactured by Mitsui Chemicals Co., Ltd.) was printed via screen printing on the peripheral edges of one of the substrates for each liquid crystal layer to form walls of a prescribed height.

The liquid crystal compounds D1, D2 and D3 were applied to each of the second substrates using an amount calculated from the height of the sealing member and the area of the part surrounded by the sealing member. Two substrates were bonded together for each liquid crystal in the same manner as in the experiment example 2 using a bonding device, and were heated at 150° C. for one hour, whereupon liquid crystal cells d1, d2 and d3 were obtained.

These three liquid crystal cells were stacked together in the order of d1, d2 and d3, whereupon a liquid crystal display element was obtained. A black light-absorbing film was placed on the back surface of the liquid crystal display element (the outside surface (back surface) of the liquid crystal cell d1).

When each liquid crystal cell was driven using prescribed voltages (for colored state −105V, 5 ms for d1, 85V, 5 ms for d2, 60V, 5 ms for d3; for non-colored state −60V, 5 ms for d1, 50V, 5 ms for d2, 35V, 5 ms for d3) in order to alternate them between a colored and non-colored state, the Y-value of the liquid crystal display element was 27.4 during white display and 4.7 during black display, while the contrast of the liquid crystal display element was 5.8:1 (W (white)/B (black)), representing good performance during both white display and black display. Because the black display performance was particularly good, a high-contrast liquid crystal display element was obtained.

Comparison Example 1

A liquid crystal compound B1 was prepared by adding 26% by weight of S-811 chiral material (manufactured by Merck & Co.) to a nematic liquid crystal mixture B ($\Delta n=0.210$, $\Delta\epsilon=38.7$, $T_{N-I}=119°$ C.). The liquid crystal compound B1 was adjusted to selectively reflect light having a wavelength of around 560 nm.

For one substrate, a glass substrate on which transparent electrodes were formed was used. A 800 Å-thick orientation film comprising a polyimide that was synthesized from the compounds indicated by the chemical formulae (1) and (2) was formed on the transparent electrodes.

For the other substrate, a glass substrate on which transparent electrodes were formed was used. A 2,000 Å-thick HIM3000 insulating film (manufactured by Hitachi Chemical Co., Ltd.) was formed on the transparent electrodes, and an 800 Å-thick orientation film comprising a polyimide that was synthesized from the compounds indicated by the chemical formulae (1) and (2) was then formed on the insulating film.

Subsequently, an XN21S sealing member (manufactured by Mitsui Chemicals Co., Ltd.) was printed via screen printing on the peripheral edges of one of the substrates to form walls of a prescribed height thereon.

The two substrates were placed opposite each other, and the cell gap was adjusted using 7 $\mu$cm-diameter spacers (manufactured by Sekisui Finechemical Co., Ltd.) placed between the substrates. The liquid crystal compound B1 was placed in the cell, whereupon a liquid crystal display element was created.

A black light-absorbing body was placed on the outside surface (back surface) of the substrate opposite the side through which light enters the element.

When the liquid crystal display element was driven using prescribed voltages (for colored state −65V, 5 ms, for non-colored state −40V, 5 ms) in order to alternate it between a colored state and non-colored state, the Y-value was 22.6 during green display and 3.8 during black display, while the contrast was 5.9:1. Because the black display performance was particularly poor, a low-contrast liquid crystal display element was obtained.

Comparison Example 2

Liquid crystal compounds A1, B1 and C1 were prepared by adding prescribed amounts, i.e., 21% by weight, 26% by weight and 36% by weight, of S-811 chiral material (manufactured by Merck & Co.) to a nematic liquid crystal mixture A ($\Delta n=0.212$, $\Delta\epsilon=44$, $T_{N-I}=103°$ C.), a nematic liquid crystal mixture B ($\Delta n=0.210$, $\Delta\epsilon=38.7$, $T_{N-I}=119°$ C.) and a nematic liquid crystal mixture C ($\Delta n=0.214$, $\Delta\epsilon=7.6$, $T_{N-I}=143°$ C.), respectively. The liquid crystal compounds A1, B1 and C1 were adjusted to selectively reflect light having wavelengths of around 680 nm, 560 nm and 480 nm, respectively.

Three polycarbonate (PC) film substrates on which transparent electrodes were formed were used as one of the pair of substrates for each liquid crystal layer. An 800 Å-thick orientation film comprising a polyimide that was synthesized from the compounds indicated by the chemical formulae (1) and (2) was formed on the transparent electrodes on each PC film substrate, and 9 $\mu$m, 7 $\mu$m and 5 $\mu$m-diameter spacers (manufactured by Sekisui Finechemical Co., Ltd.) were respectively sprayed onto the orientation films.

Three more PC film substrates on which transparent electrodes were formed were used for the other substrate of the pair of substrates for each liquid crystal layer. A 2,000 Å-thick HIM3000 insulating film (manufactured by Hitachi Chemical Co., Ltd.) was first formed on the transparent electrodes of each PC film substrate, and an 800 Å-thick orientation film comprising a polyimide that was synthesized from the compounds indicated by the chemical formulae (1) and (2) was formed on each insulating film.

Subsequently, an XN21S sealing member (manufactured by Mitsui Chemicals Co., Ltd.) was printed via screen printing on the peripheral edges of one of the substrates for each liquid crystal layer to form walls of a prescribed height.

The liquid crystal compounds A1, B1 and C1 were applied to each of the second substrates using an amount calculated from the height of the sealing member and the area of the part surrounded by the sealing member. Two substrates were bonded together for each liquid crystal in the same manner as in the experiment example 2 using a bonding device, and were heated at 150° C. for one hour, whereupon liquid crystal cells a1, b1 and c1 were obtained.

These three liquid crystal cells were stacked together in the order of a1, b1 and c1, whereupon a liquid crystal display element was obtained. A black light-absorbing film was placed on the back surface of the liquid crystal display element (the outside surface (back surface) of the liquid crystal cell a1).

When each liquid crystal cell was driven using prescribed voltages (for colored state −60V, 5 ms for a1, 65V, 5 ms for b1, 75V, 5 ms for c1; for non-colored state −40V, 5 ms for a1, 40V, 5 ms for b1, 50V, 5 ms for c1) in order to alternate them between a colored and non-colored state, the Y-values of the liquid crystal display element were 29.3 during white display and 6.1 during black display, while the contrast of the liquid crystal display element was 4.8:1 (W (white)/B (black)). Because the black display performance was particularly poor, a low-contrast liquid crystal display element was obtained.

Comparison Example 3

A liquid crystal compound B1 was prepared by adding 26% by weight of S-811 chiral material (manufactured by Merck & Co.) to a nematic liquid crystal mixture B ($\Delta n=0.210$, $\Delta \epsilon=38.7$, $T_{N-I}=119°$ C.). The liquid crystal compound B1 is adjusted to selectively reflect light having a wavelength of around 560 nm.

For one substrate, a glass substrate on which transparent electrodes were formed was used. An 800 Å-thick orientation film comprising a polyimide that was synthesized from the compounds indicated by the chemical formulae (1), (2) and (3) was formed on the transparent electrodes, and the orientation film was rubbed with nylon cloth in one direction.

For the other substrate, a glass substrate on which transparent electrodes were formed was used. A 2,000 Å-thick HIM3000 insulating film (manufactured by Hitachi Chemical Co., Ltd.) was formed on the transparent electrodes. An 800 Å-thick orientation film comprising a polyimide that was synthesized from the compounds indicated by the chemical formulae (1), (2) and (3) and that had a mesogenic group in its structure was then formed on the insulating film, and the orientation film was rubbed with nylon film in one direction.

Subsequently, an XN21S sealing member (manufactured by Mitsui Chemicals Co., Ltd.) was printed via screen printing on the peripheral edges of one of the substrates to form walls of a prescribed height thereon.

The two substrates were placed opposite each other such that the rubbing directions for each substrate were parallel, and the cell gap was adjusted using 7 μm-diameter spacers (manufactured by Sekisui Finechemical Co., Ltd.) placed between the substrates. The liquid crystal compound B1 was placed in the cell, whereupon a liquid crystal display element was created.

A black light-absorbing body was placed on the outside surface (back surface) of the substrate opposite from the side through which light enters the element.

When the liquid crystal display element was driven using prescribed voltages (for colored state −65V, 5 ms, for non-colored state −40V, 5 ms) in order to alternate it between a colored state and non-colored state, the element's dependence on the angle of view was very large when the colored state was present, and the Y-values and contrast could not be properly measured.

FIG. 5 is a table showing the results of the experiments. As shown in FIG. 4, regarding single-layered liquid crystal display elements, the contrast of the element in the experiment example 1, which had an orientation film comprising a polyimide that had a mesogenic group in its structure, was high, i.e., 8.6:1. In comparison, the contrast of the element in the comparison example 1 was low, i.e., 5.9:1. The element in the comparison example 3, which comprised the element in the experiment example 1 but had a rubbed orientation film, was highly dependent on the angle of view when the colored state was present, and did not permit proper measurement of the Y-values and contrast.

With regard to multi-layered liquid crystal display elements comprising three single-layered liquid crystal display elements, the contrast of the elements in the experiment examples 2 through 5, which each had an orientation film comprising an polymide that had a mesogenic group in its structure, was high, i.e., 5.8:1 through 6.6:1, respectively, but in comparison, the contrast of the element in the comparison example 2 was low, i.e., 4.8:1.

As described above, the contrast of the image display could be improved using the liquid crystal display element of each experiment example above. In addition, in the liquid crystal display element in each experiment example above, the element's dependence on the angle of view could be reduced.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A liquid crystal display element comprising:

a pair of substrates; and a liquid crystal layer held between the pair of substrates and including liquid crystal that exhibits a cholesteric phase as a whole, wherein at least one of the substrates has an orientation film that comprises a polyimide having a mesogenic group therein and has not undergone rubbing.

2. A liquid crystal display element as claimed in claim 1, wherein the mesogenic group comprises any one of:

(a) one of a steroid skeleton, a biphenyl skeleton and a phenylcyclohexane skeleton;

(b) a side chain of a diamine compound that forms a polyimide; and (c) a combination of (a) and (b).

3. A liquid crystal display element as claimed in claim 2, wherein a compound of the orientation film is synthesized from at least one of the following compounds:

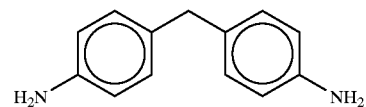

(1)

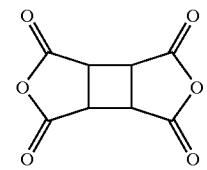

(2)

4. A liquid crystal display element as claimed in claim 3, wherein the polyimide is synthesized from the compounds indicated by the chemical formulae (1), (2) and (3) and that has a mesogenic group including a steroid skeleton therein.

5. A liquid crystal display element as claimed in claim 3, wherein the polyimide is synthesized from the compounds indicated by the chemical formulae (1), (2) and (4) and that has in a mesogenic group including a biphenyl skeleton therein.

6. A liquid crystal display element as claimed in claim 3, wherein the polyimide is synthesized from the compounds indicated by the chemical formulae (1), (2) and (5) and that has a mesogenic group including a phenylcyclohexane skeleton therein.

7. A liquid crystal display element as claimed in claim 1, wherein a thickness of the orientation film is in a range from 100 Å to 2,000 Å.

8. A liquid crystal display element as claimed in claim 1, wherein the liquid crystal is chiral nematic liquid crystal comprising nematic liquid crystal and a chiral dopant.

9. A liquid crystal display element as claimed in claim 8, wherein the chiral dopant is added in the range from 7 percent by weight to 50 percent by weight.

10. A liquid crystal display element as claimed in claim 1, wherein the liquid crystal has a selective reflection property.

11. A liquid crystal display element as claimed in claim 10, wherein the liquid crystal exhibits bistability between a focal conic state and a planer state.

12. A multi-layered liquid crystal display element comprising a plurality of liquid crystal elements stacked one upon another, wherein at least one of the liquid crystal elements comprises:
a pair of substrates; and
a liquid crystal layer held between the pair of substrates and including liquid crystal that exhibits a cholesteric phase as a whole,
wherein at least one of the substrates has an orientation film that comprises a polyimide having a mesogenic group in its structure and has not undergone rubbing.

13. A liquid crystal display element as claimed in claim 12, wherein the mesogenic group comprises any one of:
(a) one of a steroid skeleton, a biphenyl skeleton and a phenylcyclohexane skeleton;
(b) a side chain of a diamine compound that forms a polyimide; and
(c) a combination of (a) and (b).

14. A liquid crystal display element as claimed in claim 13, wherein a compound of the orientation film is synthesized from at least one of the following compounds:

15. A liquid crystal display element as claimed in claim 14, wherein the polyimide is synthesized from the compounds indicated by the chemical formulae (1), (2) and (3) and that has a mesogenic group including a steroid skeleton therein.

16. A liquid crystal display element as claimed in claim 14, wherein the polyimide is synthesized from the compounds indicated by the chemical formulae (1), (2) and (4) and that has in a mesogenic group including a biphenyl skeleton therein.

17. A liquid crystal display element as claimed in claim 14, wherein the polyimide is synthesized from the compounds indicated by the chemical formulae (1), (2) and (5) and that has a mesogenic group including a phenylcyclohexane skeleton therein.

18. A liquid crystal display element as claimed in claim 12, wherein a thickness of the orientation film is in a range from 100 Å to 2,000 Å.

19. A liquid crystal display element according to claim 1, wherein the orientation film has not undergone any orientation process.

20. A liquid crystal display element according to claim 12, wherein the orientation film has not undergone any orientation process.

21. A liquid crystal display element comprising:
   a pair of substrates; and
   a liquid crystal layer held between the pair of substrates and including liquid crystal that exhibits a cholesteric phase,
   wherein at least one of the substrates has an orientation film that comprises a polyimide having a mesogenic group therein and the orientation film has not undergone an orientation process.

22. A liquid crystal display element according to claim 21, wherein the liquid crystal exhibits a cholesteric phase as a whole.

23. A liquid crystal display element according to claim 21, wherein the orientation process is rubbing.

24. A liquid crystal display element according to claim 21, wherein the liquid crystal display element does not include a polarizer.

25. A liquid crystal display element according to claim 21, wherein the liquid crystal display element does not include an analyzer.

26. A liquid crystal display element according to claim 21, wherein the liquid crystal exhibits a selective reflection property.

27. A multi-layered liquid crystal display element comprising a plurality of liquid crystal elements stacked one upon another, wherein at least one of the liquid crystal elements comprises:
   a pair of substrates; and
   a liquid crystal layer held between the pair of substrates and including liquid crystal that exhibits a cholesteric phase,
   wherein at least one of the substrates has an orientation film that comprises a polyimide having a mesogenic group in its structure and the orientation film has not undergone rubbing or any other orientation process.

28. A liquid crystal display element according to claim 27, wherein the liquid crystal exhibits a cholesteric phase as a whole.

29. A liquid crystal display element according to claim 27, wherein the liquid crystal display element does not include a polarizer.

30. A liquid crystal display element according to claim 27, wherein the liquid crystal display element does not include an analyzer.

31. A liquid crystal display element according to claim 27, wherein the liquid crystal exhibits a selective reflection property.

* * * * *